Aug. 1, 1933. J. H. LAMONT 1,920,512
PIPE COUPLING
Filed April 20, 1932 2 Sheets-Sheet 1
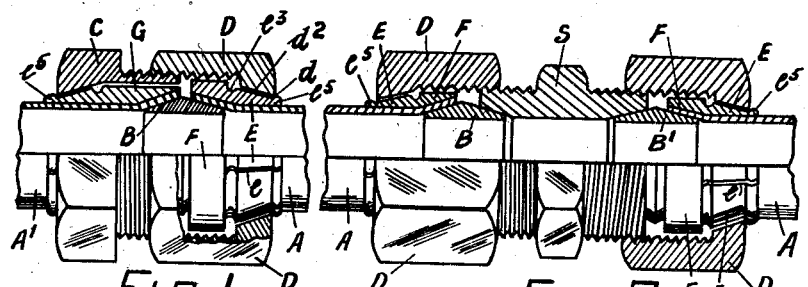
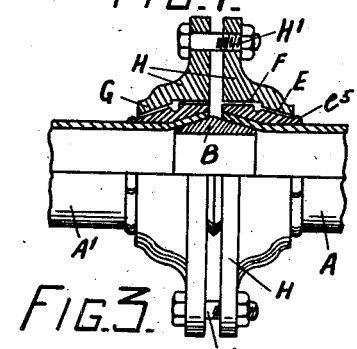
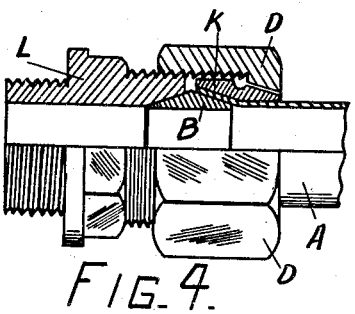
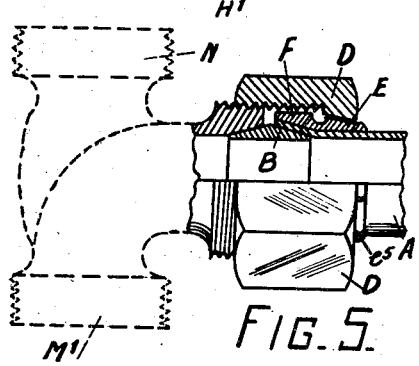
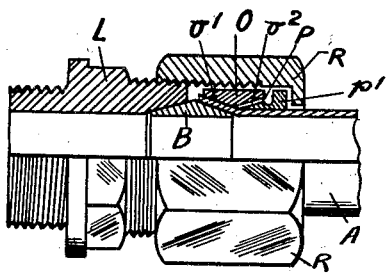
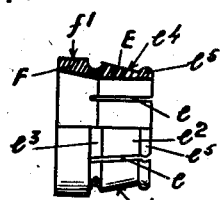
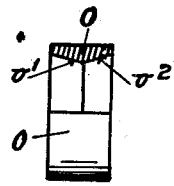
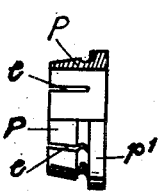
INVENTOR:
JAMES HUNTER LAMONT
By Williams, Bradbury, McCaleb & Hinkle
Attys.

Aug. 1, 1933.  J. H. LAMONT  1,920,512
PIPE COUPLING
Filed April 20, 1932   2 Sheets-Sheet 2

INVENTOR:
JAMES HUNTER LAMONT
By
Williams, Bradbury, McCaleb & Hinkle
ATTYS.

Patented Aug. 1, 1933

1,920,512

UNITED STATES PATENT OFFICE 1,920,512

PIPE COUPLING

James Hunter Lamont, Edinburgh, Scotland, assignor of one-half to John Waugh, Edinburgh, Scotland Application April 20, 1932, Serial No. 606,309, and in Great Britain December 19, 1931

9 Claims. (Cl. 285—86)

This invention relates to fluid-tight pipe joints or couplings for connecting together copper or other deformable or soft metal pipes or tubes or for connecting them to metal socket members or fittings such as angle connections or bends, cross-pieces, elbows, T-pieces or other metal junctions or unions.

The invention relates more particularly to such a pipe joint or coupling of the kind comprising a hollow plug or spigot tapered at both ends and inserted in the ends of the two pipes to be joined or in the end of one pipe and a conical seat in a socket member, the pipe (or each pipe) being drawn up over the plug by means of a correspondingly conically counterbored collar or sleeve which is fitted over the pipe and engaged by a clamping device such as a coupling nut on one pipe screwing upon a male coupling member or externally screw-threaded gland on the other pipe or socket member. Although this form of joint is to be preferred for connecting a pipe to a metal fitting, the hollow plug or spigot tapered at both ends may be replaced by forming integral with the metal fitting or securing thereto a tubular tapered or truncated conical hollow projection or spigot which will enter the end of the pipe to be joined to the metal fitting.

The present invention provides an exceptionally reliable fluid-tight pipe joint or coupling which is characterized by its ability to withstand vibration and the stresses imposed on the joint owing to contraction of the pipe under severe temperature changes. The improved pipe joint or coupling is thus admirably adaptable to steam pipes and other high pressure hot fluid conduit systems and can consequently be utilized on high buildings, marine vessels, motor road vehicles or in any other work where the pipe joint is liable to continuous or periodic vibration and/or severe temperature changes. In some pipe joints made as above defined the contraction of the pipe due to conditions of frost has been known to draw the pipe completely out of the joint or coupling and the invention has among its objects to eliminate the possibiltiy of the joint being destroyed in such a manner; also to provide an added security against the joint being loosened by vibration. A feature of the present invention is the employment of what is hereinafter termed for brevity a "split collet", which term is to be understood as defining a member having a cylindrical bore and an outer surface of truncated conical shape, which may terminate at its larger end in a cylindrical portion, the member being slit or slotted longitudinally for part of its length from the smaller end to provide a plurality of tongues or jaws capable of being compressed radially inwards, and to facilitate the said inward compression, the member may be reduced in thickness at the root of the said tongues or jaws, said reduction in thickness being conveniently obtained by forming an annular groove or recess in the outer periphery of said member at or close to the closed ends of the longitudinal slits or slots.

According to the invention, the conical surface of the said split collet cooperates with a complementary internal conical surface formed in the clamping device or on a part fitted in the clamping device employed for drawing the aforesaid collar or sleeve over the tapered portion of the plug, the said collet being fitted over the pipe so that the jaws when compressed inwards by the pressure thereon of the complementary internal conical surface provided on or in the clamping device will be compressed on to or into the surface of the pipe to firmly grip the latter and thus prevent any longitudinal displacement of the pipe within the collet.

In the preferred form of the invention the collet is fitted in such a manner in the clamping device that it is rotatable therein and prevented from being readily removed from the clamping device. For this purpose it may be permitted only a limited longitudinal movement with respect to the clamping device and this can be conveniently attained by making the smaller end of the collet with a slight bulge or enlargement and forcing it through a slightly smaller aperture in the back of the clamping device, whereupon the protruding enlarged or bulged portion of the smaller end of the collet will expand and prevent removal of the collet from the clamping device.

It is also preferred to make the collet integral with the conically counterbored collar or sleeve hereinbefore mentioned by forming the collet as an extension of the thicker end of the counterbored sleeved. The collet or combined collet and counterbored sleeve may however be made with a straight taper, that is to say, without the aforesaid bulge or enlargement at its smaller end, and be removably or loosely fitted in the clamping device.

In the preferred construction of pipe joint or coupling according to this invention, the usual plug tapered towards both ends is inserted between the pipe ends of a pair of pipes to be joined or between the pipe end and the conically counterbored socket of the socket member to which the pipe is to be connected, the pipe end or ends being preferably first flared to receive the plug. A combined counterbored sleeve and collet assembled in a coupling nut as above described is fitted over the parallel portion of the pipe and the coupling nut then screwed upon an externally screw-threaded portion of the socket member to which the pipe is to be joined, or when joining two pipe ends, the coupling nut is screwed upon an externally screw-threaded male coupling member or gland fitted on the other pipe and either conically counterbored to receive the flared end of the pipe on which it is fitted or for preference fitted with a combined counterbored sleeve and collet in a manner similar to the coupling nut. The tightening up of the coupling nut causes the counterbore of the sleeve to draw the flared pipe end over the tapered portion of the plug and simultaneously the counterbore of the coupling nut compresses the jaws of the collet on to or into the surface of the pipe, so that an exceptionally good fluid-tight and vibration-proof joint is obtained in which the pipe is held so securely by the jaws of the collet that the possibility of contraction of the pipe causing the pipe end to pull out of the joint is practically completely eliminated.

Instead of the coupling nut and its cooperating male coupling member or gland, a pair of flanges adapted to be drawn together by bolts or the like may be employed, the said flanges being conically counterbored in the same manner as the coupling nut and the male coupling member or gland.

In an alternative manner of carrying out the invention, the counterbored collar or sleeve is made integral with an oppositely counterbored part or is backed by an oppositely counterbored ring into which the jaws of the collet are forced by the coupling nut or like member, the collet in this case being reversed in the coupling nut or like member, so that its larger end abuts against a shoulder at the back of the coupling nut or like member which in this case is not formed with a conical counterbore; also in this case the collet will have a straight taper, that is to say, without a bulge or enlargement at its smaller end.

The present invention also relates to the means for giving added security to the joint against loosening by vibration and consists in providing the split collet between two adjacent tongues or jaws with a slot of such a width as to accommodate a locking key between them, one face of the locking key bearing on the pipe and being if necessary slightly concave to fit the pipe and the other face being roughened, serrated or grooved to engage a roughened, milled or knurled edge on the inside of the back aperture in the coupling nut or other coupling member. The outer face of the key is preferably formed with longitudinal grooves or serrations which, by engagement with the knurled or milled edge of the coupling nut or other coupling member, prevent rotation of the latter relative to the split collet which is firmly gripped upon the pipe by the action of completing the joint. This locking arrangement enables the locking key to be inserted in any position of the coupling nut or like member. The locking key may have an enlarged head to enable it to be more readily driven into place or removed.

Other developments of the invention will be hereinafter described by reference to the accompanying explanatory drawings illustrating various ways in which the invention can be carried into effect.

Fig. 1 is a view partly in section of the preferred form of pipe joint for directly coupling two pipe ends by the use of a coupling nut and male coupling screw or gland.

Fig. 2 is a similar view illustrating a double joint for connecting two pipe ends by means of an intermediate union member.

Fig. 3 is a view of a joint similar to that shown in Fig. 1 and constructed as a flanged joint.

Fig. 4 is a view partly in section of a further form of joint in which the combined counterbored sleeve and collet is loose in the coupling nut. A single pipe is shown in this case coupled to a metal fitting.

Fig. 5 is a view of a joint somewhat similar to that shown in Fig. 1 adapted to a metal fitting such as an elbow or T-piece.

Fig. 6 shows the combined sleeve and collet of Figs. 1, 2, 3 and 5 partly in section.

Fig. 7 shows an alternative form of joint in which the collet is separate from the sleeve, the sleeve and collet being separately shown in Figs. 8 and 9 respectively.

Figure 11:
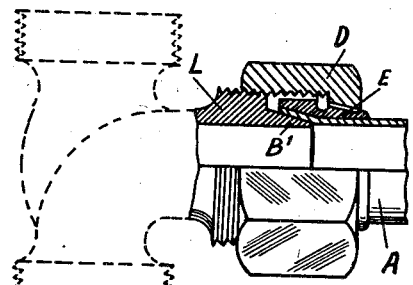

Fig. 11 is a part sectional view and part elevation of a modified form of joint in which the tapered plug is replaced by a tapered projection B' extending from the metal fitting L. The projection B' may be made integral with the metal fitting L or it may be made separate therefrom and be secured to the metal fitting by means of a brazed or soldered joint or a screw-threaded connection or in any other well-known manner.

Figure 12:
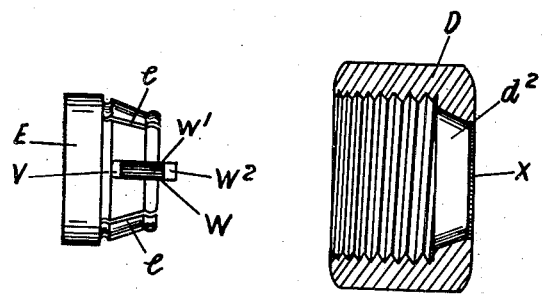
Figure 13:
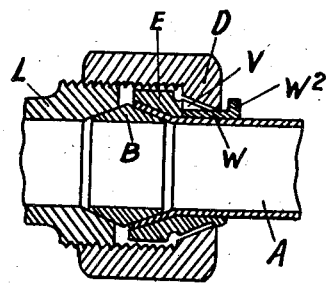

Fig. 12 is a plan view of one form of split collet with the improved locking key and showing the coupling nut separately in section. Fig. 13 is a sectional view of a joint according to the invention taken in section through the keyway of Fig. 12.

Referring firstly to Fig. 1 of the drawings which shows two pipes A and A' joined by a hollow plug or spigot B which is tapered at both ends, it will be seen that the pipe A' is fitted with an externally screw-threaded gland nut C which screws into a coupling nut D on the pipe A. The ends of the pipe are either previously flared to fit the taper of the plug B or are flared by the forcing of the plug B into the ends of the pipes when the coupling nut D is screwed up. The back end of the coupling nut D has a circular aperture $d$ of larger diameter than the pipe A and has an internal conical counterbore $d^2$ which corresponds to the external conical surface of the split collet E which is shown in detail in Fig. 6. As shown in Fig. 6, the split collet E is combined with a conically counterbored sleeve F which has a cylindrical outer surface $f'$ of such a diameter as to fit loosely within the coupling nut D. The combined collet and sleeve E, F has longitudinal slits $e$ which form jaws $e^2$, the slits $e$ extending up to an annular groove $e^3$ which forms a dividing line between the sleeve F and collet E, the latter having a conical outer surface $e^4$ corresponding to the counterbore $d^2$ in the coupling nut D into which it is fitted. The smaller end of the collet has a slight annular external bulge or enlargement $e^5$ which is forced through the back of the nut E, the jaws $e^2$ of the collet being first compressed and thereafter expanding so that the bulge $e^5$ prevents removal of the combined sleeve and collet E, F from the nut D while permitting the former to rotate in the latter.

The gland nut C is formed in a manner similar to the coupling nut D to receive a combined collet and sleeve G similar to that shown separately in Fig. 6.

It will be apparent that, when the nut D is screwed upon the gland nut C, the plug B will be forced into the pipe ends after the latter have been previously expanded. The sleeve F will also draw the pipe A over the plug B until further progress of the sleeve F is arrested, when the counterbore $d^2$ of the nut D will compress the jaws of the collet E on to the pipe A. Similarly the combined collet and sleeve G will draw the pipe A' over the plug B and its jaws will be compressed upon the pipe A', thus making a very effective fluid-tight joint, which will not be liable to loosen under vibration. Moreover, any contraction of either pipe will tend to cause the pipe to draw the combined collet and sleeve back in the coupling nut D or gland nut C and will thus cause the jaws of the collet to be more firmly compressed against the pipe and thereby prevent the pipe from being drawn out of the joint.

Fig. 2 shows a manner of joining two pipe ends by the use of two joints and an intermediate union S counterbored at both ends to receive the two plugs B. The joints shown in Fig. 2 are both similar to the joint shown in Fig. 1, except that the union S replaces pipe A', gland nut C and combined sleeve and collet G of Fig. 1 and the plugs B fit directly into the counterbored ends of the union S.

Fig. 3 shows a modification of the construction shown in Fig. 1 obtained by substituting flanged members H and connecting bolts H' for the gland nut C and coupling nut D.

In the modification shown in Fig. 4, the combined sleeve and collet K has the latter formed with a straight external taper without a bulged end and is not secured against removal from the coupling nut D. The joint is also shown as applied to the coupling of a pipe A to a metal fitting L which replaces the pipe A', gland nut C and combined sleeve and collet G of Fig. 1. Obviously the loose sleeve and collet could be adopted in the forms of joint shown in Figs. 1, 2 and 3 and the said joints could also be adapted to the coupling of a single pipe to any suitable metal fitting, such as the elbow fitting M or T-piece N shown in dotted lines in Fig. 5 which shows a joint similar to those of Fig. 2 applied to a T-piece or elbow. Obviously also the combined sleeve and collet G could be omitted from the gland nut C or flange H of Figs. 1 and 3, in which case the gland nut C or flange H would be counterbored to fit the flared end of the pipe A'.

Figure 10:
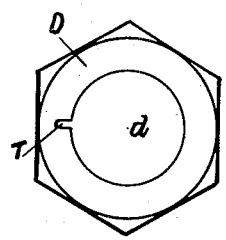
Fig. 10 is an end view of a locking nut for use as the coupling nut in joints similar to those shown in Figs. 1, 2, 4 and 5.

In order to give added security against loosening of the joint by vibration, the coupling nut D or gland nut C or both, or either or both of the flanges H may be locked against rotation on the split collet after the joint has been made or tightened up. It will be readily apparent that there are many ways in which the nut D, gland nut C or flange H could be locked to the split collet. A simple and convenient way is to make a saw drift partly through the conically counterbored part of the coupling member as shown in Fig. 10 which shows the coupling nut D formed with a saw cut or notch T extending radially from the inner edge of the aperture $d$ in the back of the nut. When the joint is assembled and tightened up, the saw cut T is brought into register with one of the slits $e$ in the collet E and a locking key may then be driven into the saw cut T and into the slit $e$ which registers with the saw cut T. As the compression of the jaws of the collet upon the pipe prevents rotation of the collet on the pipe, the coupling nut D will also be locked against rotation. Any number of saw cuts or notches T may be provided, so that one or more may be readily brought into register with the slits in the collet.

Although Figs. 1, 2, 3, 4 and 5 show the preferred form of the improved joint, it may also be constructed as shown in Figs. 7, 8 and 9 wherein the sleeve O is made separate from the collet P. In this case the sleeve O is conically counterbored at both ends at $o'$ and $o^2$, but obviously two oppositely counterbored rings could be substituted. The collet P has its jaws inserted in the counterbore $o^2$ and has a cylindrical end portion $p'$ which is engaged by the back of the coupling nut R which is not conically counterbored internally. It will be apparent that in this case the coupling nut R when screwed up forces the jaws of the collet P into the ring or sleeve O, the latter compressing the jaws of the collet on to the pipe, while the ring or sleeve O draws the pipe over the plug B. It will also be apparent that the collet P could be permanently assembled in the nut R by forming it with a cylindrical extension protruding through the back of the nut R and upset or expanded where it protrudes.

Figs. 12 and 13 show an arrangement in which a slot V of such a width as to accommodate a substantially flat locking key W is formed between two of the tongues or jaws of the split collet E. One face of the locking key bears on the pipe and is preferably slightly concave transversely to fit the pipe. The other face W' is roughened, serrated or grooved to engage a milled or knurled edge X formed on the inside of the back aperture in the coupling nut or other coupling member D. After the coupling nut has been screwed up, the key W is inserted in the slot V and the serrations on the face W' engage the knurled inner edge X of the nut D and prevent rotation of the latter. A head $W^2$ on the key W enables it to be readily driven into place or to be withdrawn if the joint is to be broken or the coupling nut is to be further tightened up.

The split collet E need not project through the back of the nut as shown; it may be of the form shown in Fig. 4.

I claim:

1. A pipe coupling for pipe of comparatively ductile metal, such as copper, brass and the like, comprising a tubular element having a tapered outward surface, the smaller end of which is adapted to enter the end of said pipe, and means for drawing said pipe over said tapered surface, said means comprising a member tapered inward correspondingly to the outward taper of said tubular element, a gripping member having a plurality of prongs arranged substantially cylindrically around the outer surface of said pipe, and a coupling member adapted to force said prongs into tight gripping engagement with said pipe and to cause its end to be drawn upon the tapered surface of said tubular element until it is tightly held between the said two tapered surfaces, so as to form a fluid-tight joint between said pipe and said tubular element, adapted to resist any pull on said pipe in a direction away from said tubular element.

2. A pipe coupling according to the preceding claim, in which said tubular element has oppositely tapered ends, one of which is adapted to enter said pipe and the other fits tightly into the inward tapered end of another tubular element, said last mentioned element being provided with means adapted to co-operate with means formed on said coupling member for drawing said pipe and said tubular elements together so as to form a fluid-tight joint therebetween, able to resist the pull on said pipe caused by contraction of the same and other like causes.

3. A pipe-joint according to claim 1 in which the said inward tapered member and the said gripping member are formed integrally.

4. A pipe joint comprising, in combination, a substantially conical member adapted to enter the ends of two pipes to be joined, a correspondingly bored collar on one of said pipes, a split collet rearwardly of said collar, a coupling nut adapted to cause said split collet to grippingly engage said pipe, and means on said coupling nut adapted to coact with means associated with the other pipe for drawing the two pipes together, all the elements of said joint having metal-to-metal contact with each other and with said pipes.

5. In a pipe joint, a substantially conically bored sleeve, a split collet integral therewith, means on said split collet for gripping engagement with a pipe, a coupling nut surrounding said integral sleeve and split collet, and means on said coupling nut and on said split collet for preventing accidental separation of the same.

6. A device for a pipe joint for joining a flared pipe end to a tubular member comprising an outer coupling member adapted for attachment to said tubular member, an inner sleeve rotatably contained within said coupling member and capable of limited endwise movement therein, and means for attaching said sleeve to and retaining it in said coupling member against accidental separation therefrom, said sleeve having a contractible portion adapted to cooperate with a contracting part on the coupling member and having a part formed internally to fit the flared end of the pipe.

7. A device as specified in claim 6 having the sleeve formed at one end with a cylindrical bore and an outer tapered surface and slit longitudinally from the smaller end of the tapered surface to provide a plurality of tongues capable of inward compression, and an internal tapered surface on the outer coupling member complementary to the tapered surface on the sleeve.

8. A device as specified in claim 6 having means for locking the outer coupling member against rotation upon the sleeve.

9. A coupling device for joining a flared pipe end to a tubular member comprising an outer coupling member having an internal conical surface terminating in a back aperture, and an inner sleeve rotatably contained within said coupling member, said sleeve having one end portion formed internally to fit the flared end of the pipe and having its other end portion contractible and formed externally conical complementary with the conical surface of the outer coupling member, said contractible portion of the sleeve having a bulged extremity forced through and engaging behind the back aperture in the coupling member.

JAMES HUNTER LAMONT.